United States Patent
Sakazawa et al.

[11] Patent Number: 5,557,276
[45] Date of Patent: Sep. 17, 1996

[54] QUANTIZER DESIGNED BY USING HUMAN VISUAL SENSITIVITY

[75] Inventors: Shigeyuki Sakazawa; Takahiro Hamada; Shuichi Matsumoto, all of Tokyo, Japan

[73] Assignee: Kokusai Denshin Denwa Kabushiki Kaisha, Japan

[21] Appl. No.: 281,294

[22] Filed: Jul. 27, 1994

[30] Foreign Application Priority Data

Aug. 13, 1993 [JP] Japan .................. 220486
Dec. 28, 1993 [JP] Japan .................. 350733

[51] Int. Cl.⁶ ........................... H03M 1/00
[52] U.S. Cl. ................................. 341/200
[58] Field of Search .................. 341/200; 348/405; 395/131, 155, 161

[56] References Cited

U.S. PATENT DOCUMENTS 5,333,012 7/1994 Singhal et al. .................. 345/405

Primary Examiner—Brian K. Young
Attorney, Agent, or Firm—Westman, Champlin & Kelly, P.A.

[57] ABSTRACT

A quantizer designed by using human visual sensitivity is disclosed, in which when postprocessing is done after inverse quantization an optimum visual sensitivity function for a system involving the postprocessing is obtained for doing quantization by using that visual sensitivity function.

Where the postprocessing that is executed after the inverse quantization consists of a filtering process with a characteristic $L(\omega)$ ($\omega$ being the frequency) and a 1:2 interpolation process, denoting the optimum visual sensitivity as the output result by $W(\omega)$ as shown in FIG. 2, the optimum equivalent sensitivity function $W'(\omega)$ is given as $$W'(\omega) = \tfrac{1}{2}[L(\omega/2)W(\omega/2) + L(\omega/2+\pi)W(\omega/2+\pi)].$$

By using this equivalent sensitivity function $W'(\omega)$ for the quantizer, it is possible to obtain a visually optimum quantizer designed by using human visual sensitivity.

5 Claims, 5 Drawing Sheets

IDEAL LOW PASS FILTER

ACTUAL FILTER

IDEAL HIGH PASS FILTER

ACTUAL FILTER

QUANTIZER DESIGNED BY USING HUMAN VISUAL SENSITIVITY

BACKGROUND OF THE INVENTION

1. Field of the Invention

This invention relates to a quantizer designed by using human visual sensitivity and, more particularly, which permits visually optimum quantization by taking postprocessing after inverse quantization into considerations.

2. Description of the Prior Art

The initial stage quantizer design was frequently made in the light of such a reference as to minimize the mean square of the quantized noise. However, it is the man that visually observes video information. Thus, an adaptive quantization method has been developed, in which coding is made according to the difference of the susceptibility of the human visual sensitivity with the frequency such that portions which are visually important are coded with fidelity while portions which are not important are coded with a certain permissible deterioration. Japanese Laid Open Patent Publication No. 10464/1991 shows techniques concerning this adaptive quantization method.

What expresses the degree of visual importance that varied with the frequency, is the human visual frequency sensitivity, i.e., the visual sensitivity function $W(\omega)$ ($\omega$ being the angular frequency). Generally, the visual sensitivity function $W(\omega)$ is obtained by producing a mathematical model of evaluations made by a plurality of persons as a result of an experiment, in which picture quality deterioration due to noise superimposed for each frequency on a predetermined prepared picture is positively evaluated. Prior art quantizers, which adopts transform coding or like coding in a frequency area, have been designed such as to minimize weighted noise energy which is obtained by weighting the mean square of noise for coding for each frequency component with the visual sensitivity function $W(\omega)$ and summing the weighted mean squares.

In the visual sensitivity function $W(\omega)$, generally importance is attached to low frequency components, and high frequency components are suppressed.

The visual sensitivity is a function about picture which is observed by the man, and where some postprocessing is done about the frequency after the quantization, the visual sensitivity can not be used directly for the quantizer design. For example, in a system as shown in FIG. 6, in which picture information 20 is quantized with a quantizer 21 using the quantization method noted above and then inversely quantized by an inverse quantizer 22 to obtain reproduced picture information 23, by adopting the visual sensitivity function $W(\omega)$ for the quantizer 21 it is possible to obtain reproduced picture information 23 having satisfactory quality. However, where one postprocessing, for instance with a high-pass filter, is done after the inverse quantization 22 as shown in FIG. 7, the low frequency components of the visual sensitivity function $W(\omega)$, to which importance is attached, are suppressed in the high-pass filter processing so that they no longer have any importance. Therefore, in the system as shown in FIG. 7 satisfactory quality reproduced picture information 25 can not be obtained by using the visual sensitivity function $W(\omega)$ for the quantization 21. In this specification, both the processes, i.e., the inverse quantization and postprocessing, are referred to as decoding process.

SUMMARY OF THE INVENTION

It is an object of the invention to provide a quantizer designed by using human visual sensitivity, which can solve the problems discussed above in the prior art, and in which when a postprocessing is done after inverse quantization, i.e., at the time of the decoding, an optimum visual sensitivity function to a system involving the postprocessing is obtained to permit quantization by using this optimum visual sensitivity function.

To attain this object, it is a feature of the invention that a human visual frequency sensitivity which is equivalent in function to the human visual frequency sensitivity with respect to decoded picture is obtained on the basis of the postprocessing at the time of the decoding for adopting the sensitivity thus obtained as the sensitivity before the decoding to a quantizer.

According to the invention, a human visual frequency sensitivity $W1(\omega)$ ($\omega$ being the angular frequency) that is equivalent in function to the human visual frequency sensitivity $W(\omega)$ with respect to picture after the decoding is obtained on the basis of the postprocessing at the time of the decoding. In the quantizer designed by using human visual sensitivity according to the invention, the human visual frequency sensitivity $W1(\omega)$ thus obtained is adopted for coding. Thus, it is possible to very readily obtain an equivalent visual sensitivity which is suited for signal processing. Further, by using the equivalent visual sensitivity for the coding and also using the equivalent visual sensitivity for the inverse coding it is possible to obtain reproduced picture with satisfactory decoded picture quality.

DETAILED DESCRIPTION OF THE PREFERRED EMBODIMENTS

Figure 1A:
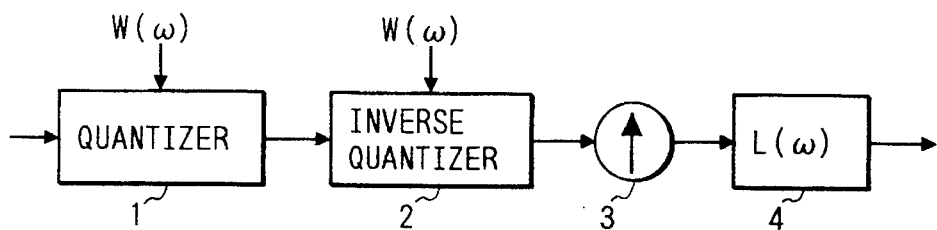
FIG. 1A is a block diagram showing a signal processing system for explaining the principles underlying the invention.
Figure 1B:
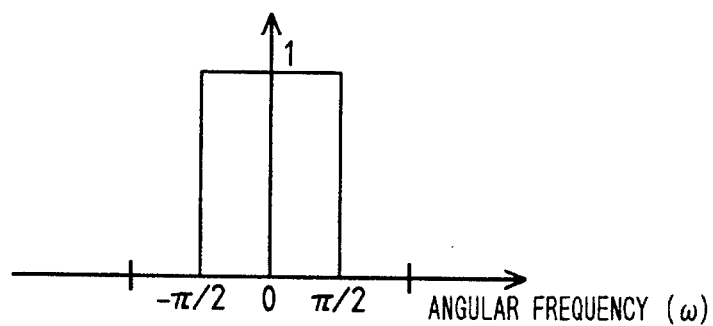
FIG. 1B is a graph showing a characteristic of an ideal low-pass filter.

Now, the invention will be described in detail with reference to the drawings. The principles underlying the invention will now be described. First, a signal processing system suitable for explaining the principles, i.e., a signal processing system, in which postprocessing with a 1:2 interpolator and a low-pass filter is executed after inverse quantization, will be described with reference to FIG. 1A. Referring to FIG. 1A, a quantizer 1 switches the step size of the quantization for each frequency component of data as the subject of coding according to the visual sensitivity function that is adopted. An inverse quantizer 2 obtains a discrete signal value from a quantization level number output from the quantizer 1. A 1:2 interpolator 3 doubles the number of data pieces by inserting a "0" between adjacent data pieces of a uni-dimensional data series. An ideal low-pass filter 4 is a filter having a characteristic $L(\omega)$ as shown in FIG. 1B.

Figure 2:
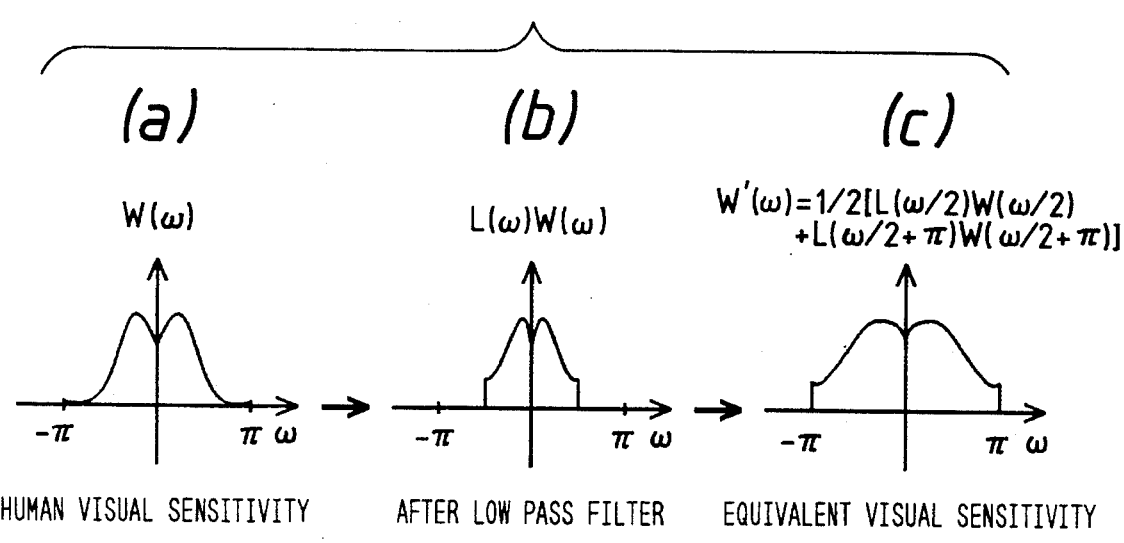
FIG. 2 is graphs for explaining the derivation of equivalent visual sensitivity from visual sensitivity.

According to the invention, an equivalent visual sensitivity $W'(\omega)$ that is applied to the quantizer 1 is obtained by causing reflection of the influence of each process in the form of going up the signal processing from the low-pass filter 4 to the inverse quantizer 2. More specifically, as shown in FIG. 2, the equivalent visual sensitivity $W'(\omega)$ is obtained by causing reflection of the influence of the low-pass filter 4 and then causing reflection of the influence of the 1:2 interpolator.

Specifically, if the visual sensitivity noted above generally used in the prior art had the characteristic $W(\omega)$ as shown in FIG. 1A, by causing reflection of the influence of the low-pass filter 4 on this visual sensitivity, the resultant visual sensitivity is $L(\omega)W(\omega)$. By causing reflection of the influence of the 1:2 interpolator 3 on this visual sensitivity $L(\omega)W(\omega)$, the resultant visual sensitivity $W'(\omega)$ is given as $$W'(\omega)=\tfrac{1}{2}\{L(\omega/2)W(\omega/2)+L(\omega/2+\pi)W(\omega/2+\pi)\} \quad (1)$$

In the signal processing system shown in FIG. 1A, visually optimum quantization is obtainable by using the equivalent visual sensitivity $W'(\omega)$ for the quantizer 1 for quantization. The reason why the above equation (1) is obtainable will be explained later in the last of the description of following embodiments.

Now, embodiments of the invention applied to a specific system will be described. First, an embodiment will be described, in which the invention is applied to a quantizer of a CDTV/HDTV compatible system.

Figure 3:
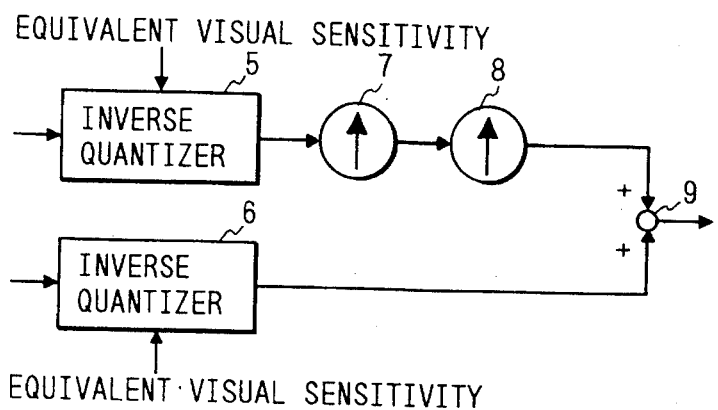
FIG. 3 is a block diagram showing a HDTV/CDTV compatible decoder for explaining a first embodiment of the invention.

FIG. 3 is a block diagram showing a decoder in a CDTV/HDTV compatible system. CDTV represents a conventional definition television system such as NTSC, PAL, etc., and HDTV represents a high definition television system.

Referring to the Figure, designated at 5 is an inverse quantizer for CDTV and HDTV compatible signal, at 6 an inverse quantizer for a residual complemental signal as a result of subtraction of the compatible signal from the HDTV signal, at 7 a vertical 1:2 interpolator, at 8 a horizontal 1:2 interpolator, and at 9 an adder.

In the decoder circuit having the above construction, the compatible signal of the CDTV and HDTV is decoded in the inverse quantizer 5. Then, the vertical 1:2 interpolator 7 inserts a "0" between adjacent vertical data pieces in uni-dimensional data series. Then, the horizontal 1:2 interpolator 8 inserts a "0" between adjacent data pieces in the horizontal direction. Meanwhile, the complemental signal is decoded in the inverse quantizer 6. The output of the inverse quantizer 6 is then added in the adder 9 to the vertically and horizontally interpolated compatible signal noted above. The adder 9 generates and outputs a visible high definition television signal.

Figure 7:
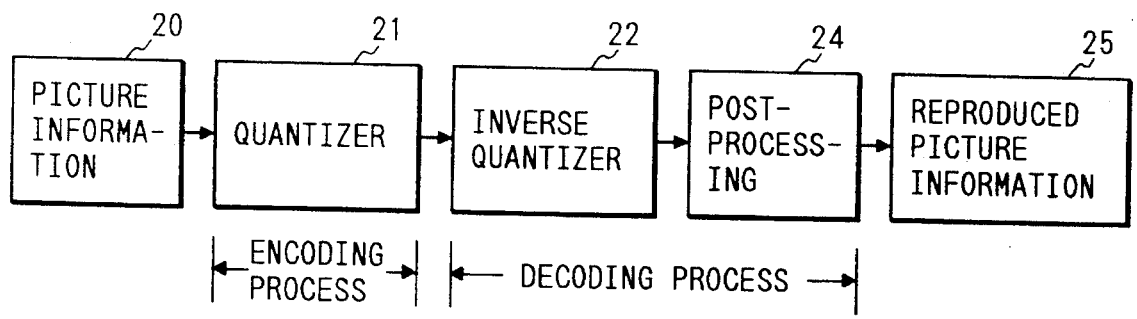
FIG. 7 is a block diagram of a quantizing and inversely quantizing system pertaining to the invention.

This decoder circuit, as is obvious from FIG. 7, is an example, in which the postprocessing in the decoding process comprises the vertical 1:2 interpolation and the horizontal 1:2 interpolation.

Denoting the visual sensitivity with respect to the output result from the adder 9 by $W(\omega 1, \omega 2)$, the equivalent visual sensitivity $W1(\omega 1, \omega 2)$ with respect to the compatible signal is obtainable by causing reflection of the vertical 1:2 interpolation and the horizontal 1:2 interpolation on the visual sensitivity. Thus, it can be shown as the following equation. Here, $\omega 1$ is the horizontal angular frequency, and $\omega 2$ is the vertical angular frequency. This is so in the following description as well.

First, by causing reflection of the postprocessing in the horizontal 1:2 interpolator 8 on the visual sensitivity, the visual sensitivity characteristic $WH(\omega 1, \omega 2)$ is $$WH(\omega 1, \omega 2)=\tfrac{1}{2}[W(\omega \tfrac{1}{2}, \omega 2)+W(\omega \tfrac{1}{2}+\pi, \omega 2)].$$

Then, by causing reflection of the postprocessing in the vertical 1:2 interpolator 7 on the visual sensitivity $WH(\omega 1, \omega 2)$, the intended equivalent visual sensitivity $W1(\omega 1, \omega 2)$ is given as $$W1(\omega 1, \omega 2)=\tfrac{1}{4}[W(\omega \tfrac{1}{2}, \omega \tfrac{2}{2})+W(\omega \tfrac{1}{2}+\pi, \omega \tfrac{2}{2})+W(\omega \tfrac{1}{2}, \omega \tfrac{2}{2}+\pi)+W(\omega \tfrac{1}{2}+\pi, \omega \tfrac{2}{2}+\pi)].$$

On the other hand, the equivalent visual sensitivity $W2(\omega 1, \omega 2)$ with respect to the complemental signal is subjected to no postprocessing, so that it is given as $$W2(\omega 1, \omega 2)=W(\omega 1, \omega 2).$$

Thus, in a coding system (not shown), using the equivalent visual sensitivities $W1(\omega 1, \omega 2)$ and $W2(\omega 1, \omega 2)$ given by the above equations for the quantizer to encode (i.e., quantize) the compatible and complemental signals, a visually optimum visible signal is obtainable at the output of the adder 9 in the decoder circuit.

Figure 4:
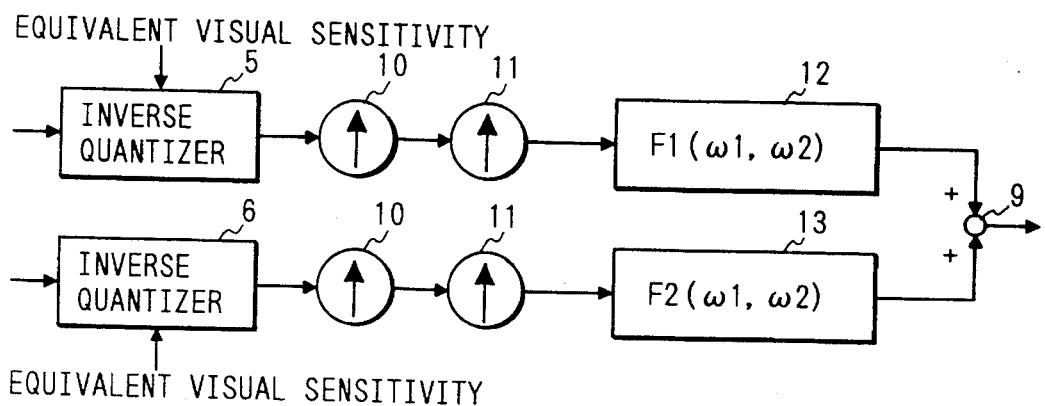
FIG. 4 is a block diagram showing a sub-band decoder for explaining a second embodiment of the invention.

Now, a second embodiment of the invention will be described. In this embodiment, the invention is applied to a quantizer in a sub-band coding system. FIG. 4 is a block diagram showing the decoding side of the sub-band coding system.

Referring to the Figure, designated at 5 is an inverse quantizer for low frequency components, at 6 an inverse quantizer for high frequency components. Designated at 10 is a vertical 1:2 interpolator, at 11 a horizontal 1:2 interpolator, at 12 a low-pass filter with a filter characteristic of $F1(\omega 1, \omega 2)$, at 13 a high-pass filter with a filter characteristic of $F2(\omega 1, \omega 2)$, and at 9 an adder.

In the decoder circuit having the above construction, low frequency components of signal are inversely quantized in the inverse quantizer 5, while high frequency components are inversely quantized in the inverse quantizer 6. These inversely quantized signals are then vertically 1:2 interpolated in the vertical 1:2 interpolators 10 and horizontally 1:2 interpolated in the horizontal 1:2 interpolators 11. The low frequency component signal having been vertically and horizontally 1:2 interpolated is then processed through the low-pass filter 12 with the filter characteristic of $F1(\omega 1, \omega 2)$ before being coupled to the adder 9. Meanwhile, the high frequency component signal having been vertically and horizontally 1:2 interpolated is processed through the high-pass filter 13 with the filter characteristic of $F2(\omega 1, \omega 2)$ before being coupled to the adder 9. In the adder 9, the signals passed through the low- and high-pass filters 12 and 13 are added together to obtain a visible signal.

This decoder circuit, as is obvious from FIG. 7, is an example, in which the postprocessing in the decoding process comprises the vertical 1:2 interpolation, the horizontal 1:2 interpolation and the filter processing through the low- and high-pass filters.

Denoting the visual sensitivity with respect to the output result from the adder 9 by $W(\omega 1, \omega 2)$, the equivalent visual sensitivity W1(ω 1, ω 2) with respect to the low frequency signal is obtained as follows. First, by causing reflection of the postprocessing through the low-pass filter 12 with the filter characteristic F1(ω 1, ω 2) on the visual sensitivity, the visual sensitivity characteristic WF(ω 1, ω 2) is $$WF(\omega 1, \omega 2) = F1(\omega 1, \omega 2)W(\omega 1, \omega 2).$$

Then by causing reflection of the vertical 1:2 interpolation and the horizontal 1:2 interpolation on the visual sensitivity characteristic WF(ω 1, ω 2), the equivalent visual sensitivity W1(ω 1, ω 2) is obtained as $$W1(\omega 1, \omega 2) = \frac{1}{4}[F1 (\omega \tfrac{1}{2}, \omega \tfrac{2}{2})W (\omega \tfrac{1}{2}, \omega \tfrac{2}{2}) + F1 (\omega \tfrac{1}{2}+\pi, \omega \tfrac{2}{2})W(\omega \tfrac{1}{2}+\pi, \omega \tfrac{2}{2}) + F1 (\omega \tfrac{1}{2}, \omega \tfrac{2}{2}+\pi) W(\omega \tfrac{1}{2}, \omega \tfrac{2}{2}+\pi) + F1 (\omega \tfrac{1}{2}+\pi, \omega \tfrac{2}{2}+\pi)W(\omega \tfrac{1}{2}+\pi, \omega \tfrac{2}{2}+\pi)].$$

Likewise, the equivalent visual sensitivity W1(ω 1, ω 2) with respect to the high frequency signal is obtained as $$W2 (\omega 1, \omega 2) = \frac{1}{4}[F2(\omega \tfrac{1}{2}, \omega \tfrac{2}{2})W (\omega \tfrac{1}{2}, \omega \tfrac{2}{2}) + F2(\omega \tfrac{1}{2}+\pi, \omega \tfrac{2}{2})W(\omega \tfrac{1}{2}+\pi, \omega \tfrac{2}{2}) + F2(\omega \tfrac{1}{2}, \omega \tfrac{2}{2}+\pi) W(\omega \tfrac{1}{2}, \omega \tfrac{2}{2}+\pi) + F2(\omega \tfrac{1}{2}+\pi, \omega \tfrac{2}{2}+\pi) W(\omega \tfrac{1}{2}+\pi, \omega \tfrac{2}{2}+\pi)].$$

Thus, by setting the equivalent visual sensitivities W1(ω 1, ω 2) and W2(ω 1, ω 2) for a quantizer (not shown), it is possible to obtain visually optimum quantization, and a visually optimum visible signal is obtainable as the output of the adder 9 of the decoder circuit.

Figure 5:
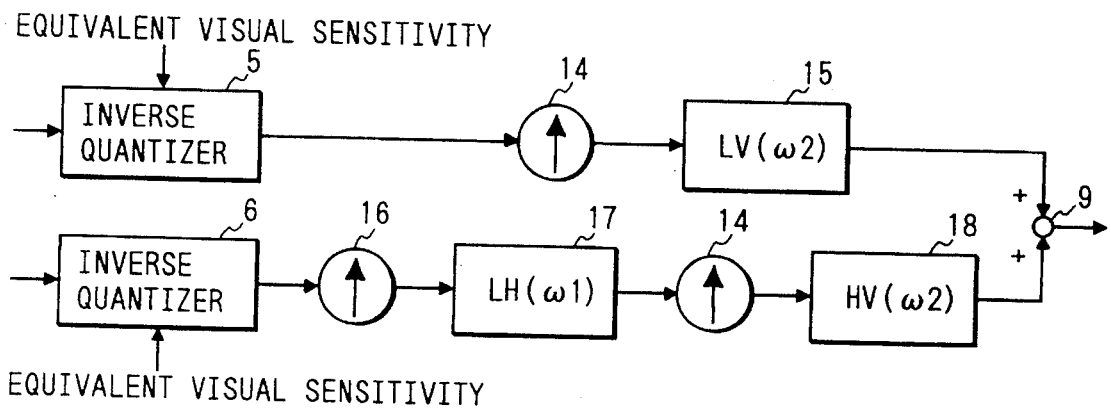
FIG. 5 is a block diagram showing an EDTV2 decoder for explaining a third embodiment of the invention.
Figure 6:
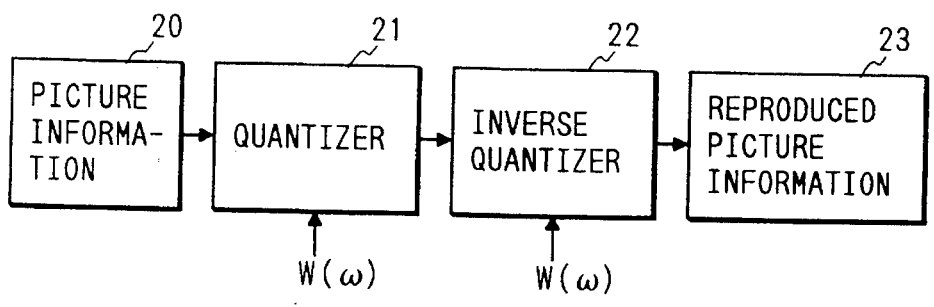
FIG. 6 is a block diagram showing a typical prior art quantizing and inversely quantizing system.

Now, a third embodiment of the invention will be described with reference to FIG. 5. FIG. 5 is a block diagram showing a decoder of a extended definition television system (EDTV2) in the next generation in Japan. The EDTV2 is described in detail in "Technical Reports of the Institute of Electronic Information Communication Engineers of Japan (Image Engineering)" issued by the Institute of Electronic Information Communication Engineers of Japan, Apr. 23, 1992, pp. 57–64.

Referring to FIG. 5, designated at 5 is an inverse quantizer for inversely quantizing video signal, at 6 is an inverse quantizer for a reinforced signal, and at 15 a low-pass filter with a vertical pass characteristic of Lv(ω 2). Designated at 16 is a horizontal 1:3 interpolator, at 17 a low-pass filter with a horizontal pass characteristic of LH(ω 1), at 18 a high-pass filter with a vertical pass characteristic of HV(ω 2), and at 9 an adder.

Denoting the visual sensitivity with respect to the output result from the adder 9 by W(ω 1, ω 2), the equivalent visual sensitivity W1(ω 1, ω 2) with respect to the video signal is $$W1(\omega 1, \omega 2) = \frac{1}{2}[LV(\omega \tfrac{2}{2})W (\omega 1, \omega \tfrac{2}{2}) + LV (\omega \tfrac{2}{2}+\pi)W(\omega 1, \omega \tfrac{2}{2}+\pi)]$$

Meanwhile, the equivalent visual sensitivity W2(ω 1, ω 2) with respect to the reinforced signal is obtained as follows. By causing reflection of the postprocessing through the high-pass filter 18 with the filter characteristic of WH(ω 2) on the visual sensitivity, the visual sensitivity characteristic WV(ω 1, ω 2) is given as $$WV(\omega 1, \omega 2) = HV(\omega 2)W(\omega 1, \omega 2).$$

Then, by causing reflection of the postprocessing through the vertical 1:2 interpolator 14, the resultant visual sensitivity characteristic WVW(ω 1, ω 2) is $$WVW(\omega 1, \omega 2) = \frac{1}{2}[HV(\omega \tfrac{2}{2})W (\omega 1, \omega \tfrac{2}{2}) + HV(\omega \tfrac{2}{2}+\pi) W(\omega 1, \omega \tfrac{2}{2}+\pi)].$$

Then, by causing reflection of the postprocessing of the low-pass filter 17 with the pass characteristic of LH(ω 1), the resultant visual sensitivity characteristic WVWH(ω 1, ω 2) is $$WVWH(\omega 1, \omega 2) = \frac{1}{2}LH(\omega 1)[ HV(\omega 2/2)W(\omega 1, \omega \tfrac{2}{2}) + HV(\omega \tfrac{2}{2}+\pi)W(\omega 1, \omega \tfrac{2}{2}+\pi)].$$

Finally, by causing reflection of the postprocessing through the horizontal 1:3 interpolator 16, the equivalent visual sensitivity W2(ω 1, ω 2) with respect to the reinforcement signal is $$W2(\omega 1, \omega 2) = \frac{1}{6}LH(\omega \tfrac{1}{3})\{ HV(\omega \tfrac{2}{2})W(\omega \tfrac{1}{3}, \omega \tfrac{2}{2}) + HV(\omega \tfrac{2}{2}+\pi)W(\omega \tfrac{1}{3}, \omega \tfrac{2}{2}+\pi)\} + \frac{1}{6}LH(\omega \tfrac{1}{3}+2\pi/3) \{HV(\omega \tfrac{2}{2})W(\omega \tfrac{1}{3}+2\pi/3, \omega \tfrac{2}{2}) + HV(\omega \tfrac{2}{2}+\pi)W(\omega \tfrac{1}{3}+2\pi/3, \omega \tfrac{2}{2}+\pi)\} + \frac{1}{6}LH(\omega \tfrac{1}{3}+4\pi/3)\{HV (\omega \tfrac{2}{2})W(\omega \tfrac{1}{3}+4\pi/3, \omega \tfrac{2}{2}) + HV(\omega \tfrac{2}{2}+\pi) W(\omega \tfrac{1}{3}+4\pi/3, \omega \tfrac{2}{2}+\pi)\}.$$

Thus, by applying the equivalent visual sensitivities W1(ω 1, ω 2) and W2(ω 1, ω 2) to a quantizer (not shown), visually optimum quantization is obtainable.

Now, an example of the method of designing a quantizer by using the equivalent visual sensitivities obtained in the above embodiments will be described. Generally, a visually optimum quantizer is one, which minimizes the energy of weighted noise signal resulting from the weighting of noise accompanying the encoding and decoding (inclusive of the postprocessing) for each frequency component with the visual sensitivity. According to the invention noise resulting from the quantization and inverse quantization is weighted with the above equivalent visual sensitivities for each frequency component, whereby a weighted noise signal is obtainable, which is quite the same as that is shown above, i.e., the minimized weighted noise.

In the actual quantizer design, there is a restrictive condition that the amount of information that is generated as a result of the quantization (hereinafter referred to as generated information amount) has to be held within a predetermined value. The generated information amount is related to the step size of the quantizer.

Specifically, the generated information amount is increased with reducing step size. Conversely, it is reduced with increasing step size.

Meanwhile, to obtain the weighted noise energy, the input signal is divided into a plurality of frequency components, and a value is obtained for each frequency component. By providing the step size of the quantizer for each of the values, the relationship between the value of the quantized noise and the value of signal is predetermined. The weighted noise signal energy is obtained by multiplying the equivalent visual sensitivity by the each value of the quantized noise and summing the products for the individual frequency components. Under the condition of a constant generated information amount, the step size Δ k of the quantizer with respect to the k-th frequency component (k being a positive integer) can be determined absolutely by using the Lagrange multiplier method. The quantizer which is designed in this way, from the definition, is a visually optimum quantizer.

Figure 8:
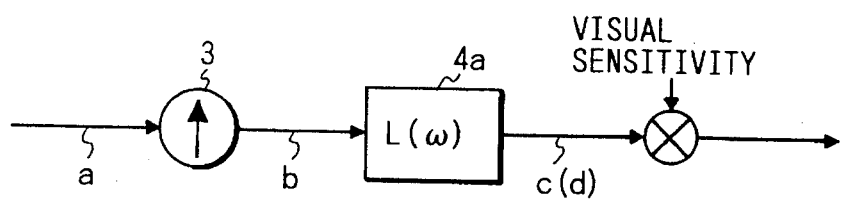
FIG. 8 is a circuit diagram showing a system including a 1:2 interpolator and a filter $L(\omega)$.

A supplementary explanation of the reason why the equation (1) is obtainable will now be given. Referring to FIG. 8, the input signal to the 1:2 interpolator 3 is labeled "a", the output signal is labeled "b", and the output signal of the filter L(ω) 4a is labeled "c" (or "d"). FIGS. 9A to 9D show spectra of the signals "a" to "d".

Referring to FIGS. 9A to 9D', the shaded signal component labeled A is the intrinsic signal component. The signal component labeled B is generated by sampling which, although not shown in the Figures, is done before the signal "a" shown in FIG. 8. This signal is removed in the next filtering stage.

Figure 10A:
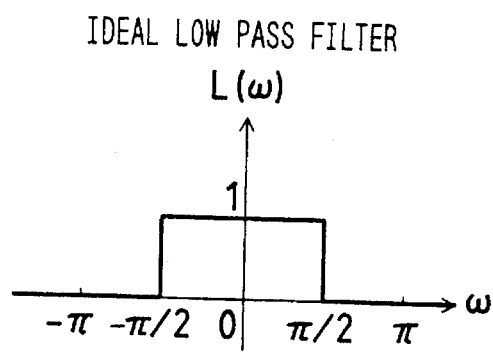
FIGS. 10A to 10D are graphs showing characteristics of ideal and actual filters.
Figure 10B:
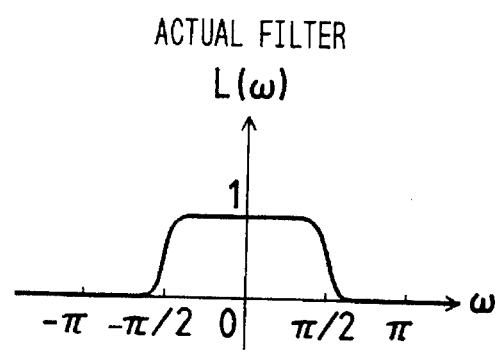

If the filter 4a is an ideal low-pass filter as shown in FIG. 10A, the component B of the signal "b" has no influence at all on the signal "c". Thus, regarding the signal "c", the visual sensitivity $W(\omega)$ is thought such that $-\pi \leq \omega \leq \pi$. However, in the stage of signal "b", there may be influence on the signal "c" only in a range of $-\omega/2 \leq \omega \leq \omega/2$. $L(\omega)$ is "1" in a range of $-\pi/2 \leq \omega \leq \pi/2$ and "0" otherwise. Thus, with respect to the signal "b" the equivalent visual sensitivity $W1(\omega)$ is given as $W1(\omega)=L(\omega)W(\omega)$.

In the signal "a" in the process one step ahead, the equivalent visual sensitivity $W'(\omega)$ is $L(\omega/2)W(\omega/2)$ because the waveform of the signal "b" is pulled horizontally. With this alone, however, the area is doubled. Accordingly, the above equivalent visual sensitivity may be multiplied by a factor of ½ so that $W'(\omega)=\frac{1}{2}L(\omega/2)W(\omega/2)$.

Figure 9A:
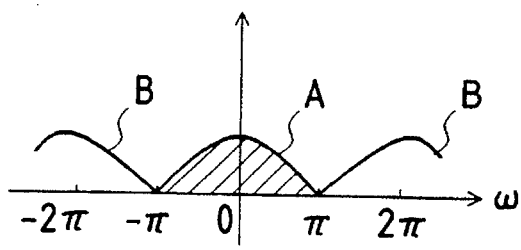
FIGS. 9A to 9D' are graphs showing spectra of signals appearing in various parts of the circuit with characteristics shown in FIG. 8.
Figure 9B:
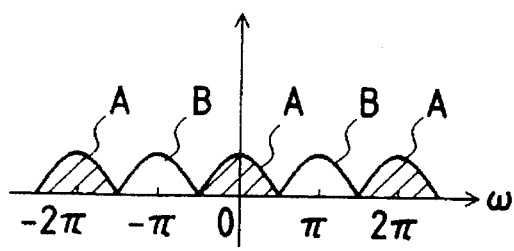
Figure 9C:
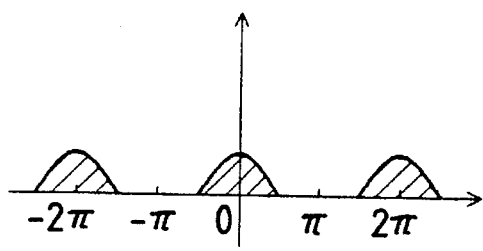
Figure 9D:
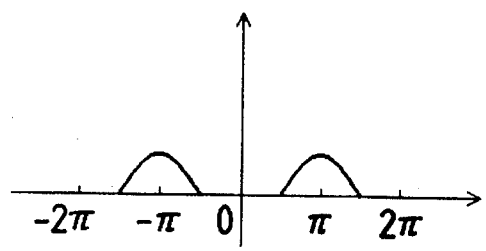
Figure 9C:
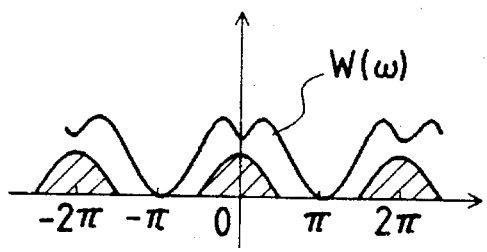
Figure 9D:
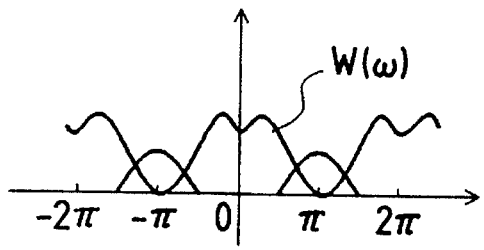
Figure 10C:
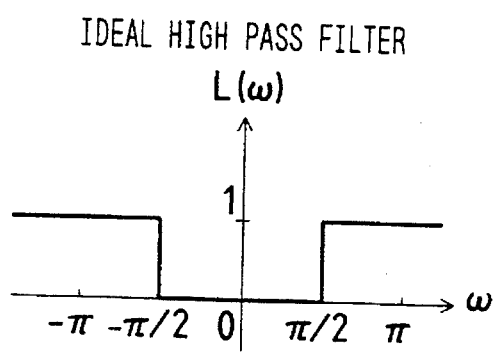
Figure 10D:
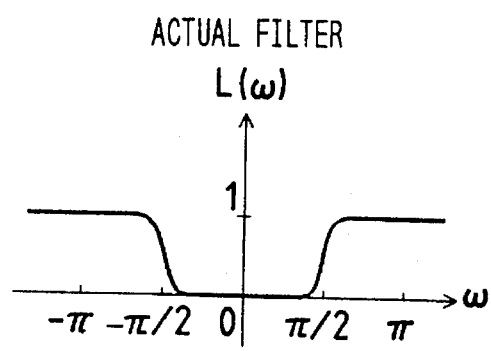

Next, if the filter 4a is an ideal high-pass filter as shown in FIG. 10C, the signal "c" has a spectrum as shown in FIG. 9D. In FIGS. 9A to 9D', the component B is the intrinsic signal component, and the signal component A is one which is to be eliminated. However, the signal "a" does not have any component B in a range of $-\pi \leq \omega \leq \pi$. Accordingly, noting the identity of the waveforms of the signal components A and B, the component A is used to substitute for the component B. As is seen from the positional relationship between the signal components in FIGS. 9C' and 9D' and the visual sensitivity curve, by superimposing the visual sensitivity curve on the component A with a deviation by $\pi$, an equivalent curve to the case when the component B and the visual sensitivity curve are superimposed is obtained. Thus, with respect to the signal "b" the equivalent visual sensitivity $W1(\omega)$ can be given as $W1(\omega)=L(\omega+\pi)W(\omega+\pi)$.

Thus, similar to the case when the filter 4a is an ideal low-pass filter, the equivalent visual sensitivity $W'(\omega)$ with respect to the signal "a" is $W'(\omega)=\frac{1}{2}L(\omega/2+\pi)W(\omega/2+\pi)$.

If the filter 4a is not an ideal filter, it has a characteristic intermediate between the ideal low-pass filter and the ideal high-pass filter. Thus, with respect to the signal "a" the equivalent visual sensitivity $W'(\omega)$ is the same as the equation (1), that is, $W'(\omega)=\frac{1}{2}[L(\omega/2) W(\omega/2)+L(\omega/2+\pi)W(\omega/2+\pi)]$.

As has been described in the foregoing, according to the invention, when a signal processing regarding the frequency is done after inverse quantization, an equivalent visual sensitivity which is fitted for the signal processing can be very readily obtained. In addition, since the equivalent visual sensitivity is the optimum visual sensitivity characteristic as verified in connection with the principles underlying the invention, it is possible to obtain reproduced picture having satisfactory decoded picture quality by using the equivalent visual sensitivity for the quantization and using the equivalent visual sensitivity for the inverse quantization.

Further, it is possible to very readily design a quantizer for a system, in which some processing is done after inverse quantization.

What is claimed is:

1. In a quantizer used for a picture signal coder in a system, in which postprocessing is carried out in a decoding process, a quantizer designed by using human visual sensitivity, in which a human visual frequency sensitivity $W1(\omega)$ ($\omega$ being the angular frequency) equivalent in function to the human visual frequency sensitivity $W(\omega)$ with respect to picture after decoding is obtained on the basis of the postprocessing in the decoding process, the obtained human visual frequency sensitivity $W1(\omega)$ being used as the visual sensitivity prior to the decoding for quantization.

2. The quantizer designed by using human visual sensitivity according to claim 1, wherein:

when the human visual frequency sensitivity after the decoding is $W(\omega)$ and the postprocessing in the decoding process is constituted by a 1:M (M being a positive integer) interpolation process, the visual sensitivity $W2(\omega)$ before the decoding process is obtained using an equation $$W2(\omega) = \frac{1}{M} \sum_{m=0}^{M-1} W\left( \frac{\omega}{M} + \frac{2m}{M} \pi \right)$$

3. The quantizer designed by using human visual sensitivity according to claim 1, wherein:

when the human visual frequency sensitivity after the decoding process is $W(\omega)$ and the postprocessing in the decoding process is constituted by a filtering process with a filter characteristic $H(\omega)$, the visual sensitivity $W3(\omega)$ before the decoding process is obtained using an equation $W3(\omega)=H(\omega)W(\omega)$.

4. The quantizer designed by using human visual sensitivity according to claim 1, wherein:

when the human visual frequency sensitivity after the decoding process is $W(\omega)$ and the postprocessing in the decoding process is constituted by a 1:M (M being a positive integer) interpolation process and a filtering process with a filter characteristic $H(\omega)$, the visual sensitivity $W1(\omega)$ before the decoding is obtained as a combination of the following visual sensitivities $W2(\omega)$ and $W3(\omega)$, as a result being $W4(\omega)$.

$$W2(\omega) = \frac{1}{M} \sum_{m=0}^{M-1} W\left( \frac{\omega}{M} + \frac{2m}{M} \pi \right)$$

$W3(\omega) = H(\omega) W(\omega)$ $$W4(\omega) = \frac{1}{M} \sum_{m=0}^{M-1} H\left( \frac{\omega}{M} + \frac{2m}{M} \pi \right) \cdot W\left( \frac{\omega}{M} + \frac{2m}{M} \pi \right)$$

5. In a quantizer for a system, in which a picture signal is divided into a plurality of frequency components and also in which a decoding process is constituted by a 1:M (M being a positive integer) interpolation process and/or a process with a filter $H(\omega)$, a quantizer designed by using human visual sensitivity, wherein the step size $\Delta k$ of the quantizer with respect to the k-th (k being a positive integer) frequency component is such as to minimize the sum of the results of weighting of the mean square noise by the visual sensitivity for the individual frequency components under the condition of a constant coded information amount.

* * * * *